(No Model.) 3 Sheets—Sheet 1.
R. EICKEMEYER.
DYNAMO ELECTRIC MACHINE.
No. 454,336. Patented June 16, 1891.
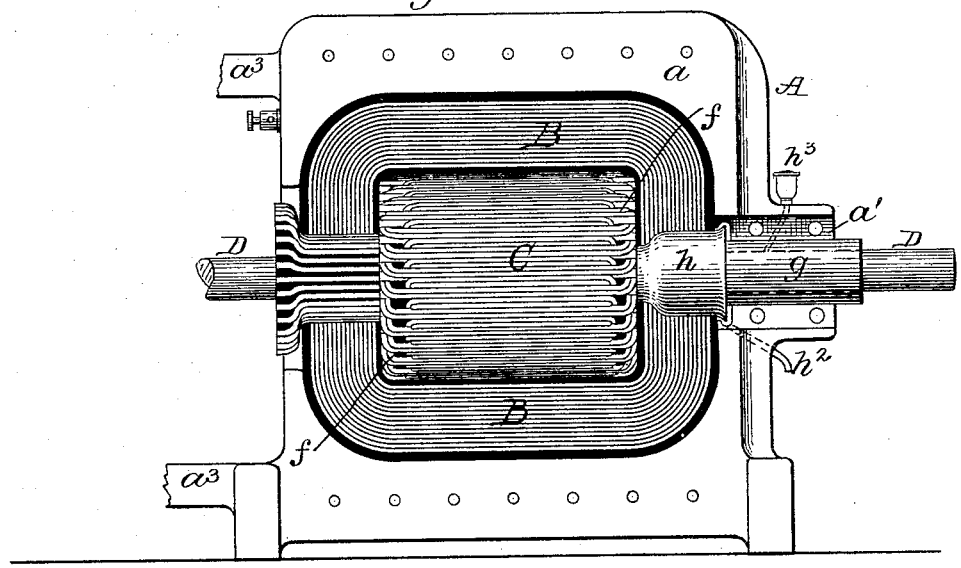
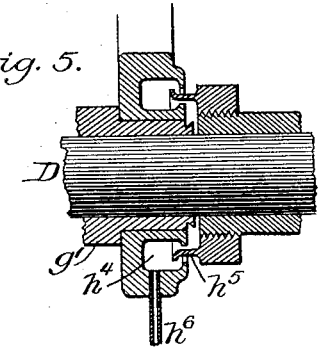
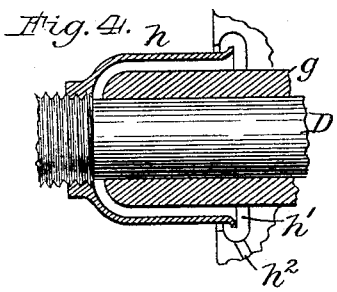
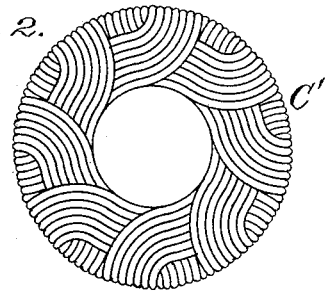
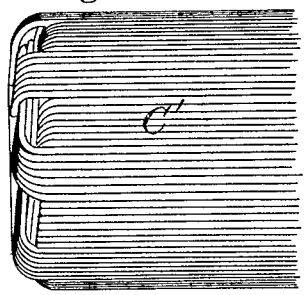
Attest:
Philip F. Larner
Lowell Bartle
Inventor:
Rudolf Eickemeyer
By Wm. O. Wood
Attorney (No Model.) 3 Sheets—Sheet 2.
R. EICKEMEYER.
DYNAMO ELECTRIC MACHINE.
No. 454,336. Patented June 16, 1891.
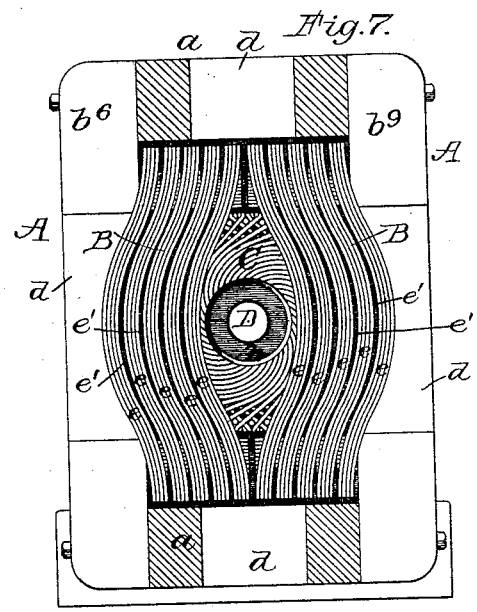
Fig. 7.
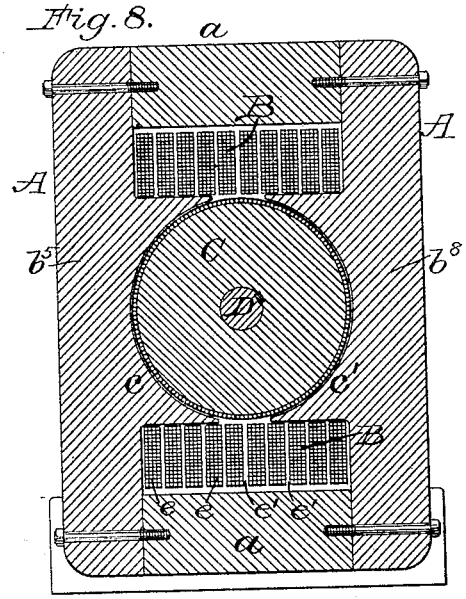
Fig. 8.
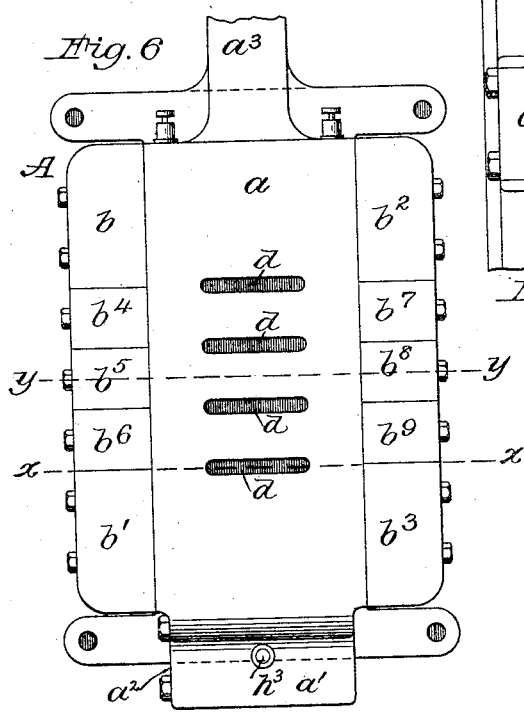
Fig. 6.
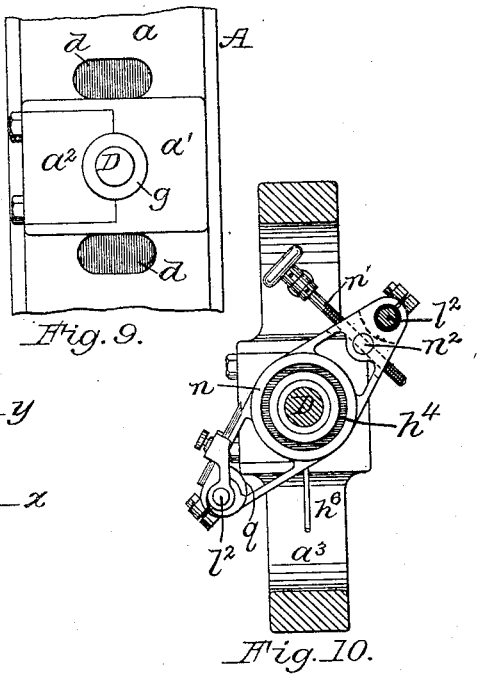
Fig. 9.
Fig. 10.
Attest:
Philip F. Larner
Nowell Bartl
Inventor:
Rudolf Eickemeyer
By Wm C Mwd
Attorney.
THE NORRIS PETERS CO., PHOTO-LITHO., WASHINGTON, D. C.

(No Model.) 3 Sheets—Sheet 3.
R. EICKEMEYER.
DYNAMO ELECTRIC MACHINE.
No. 454,336. Patented June 16, 1891.
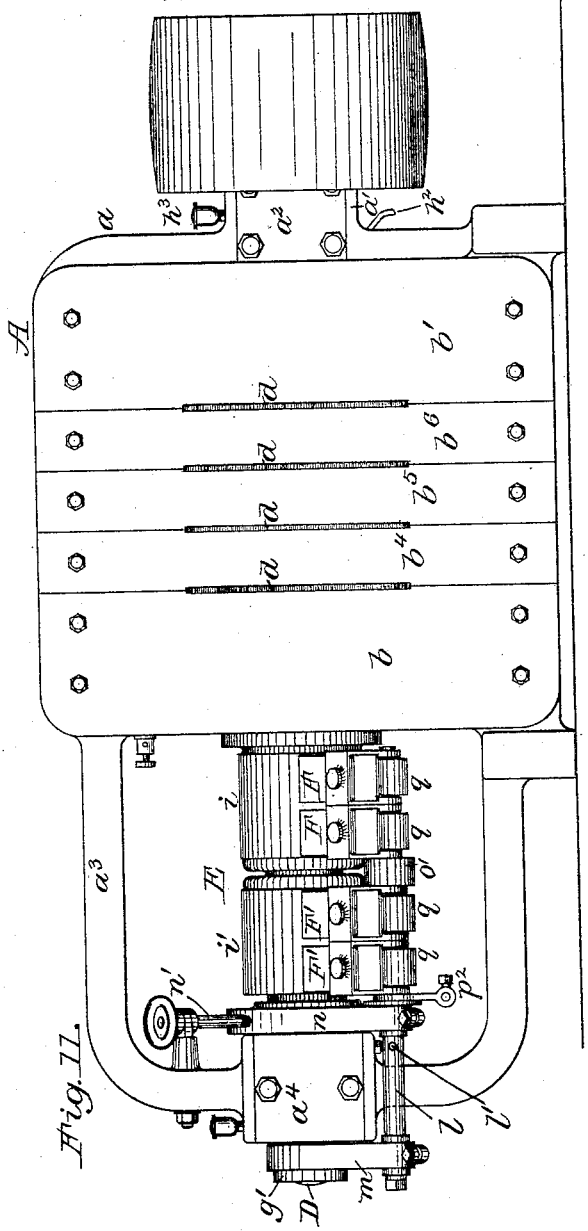
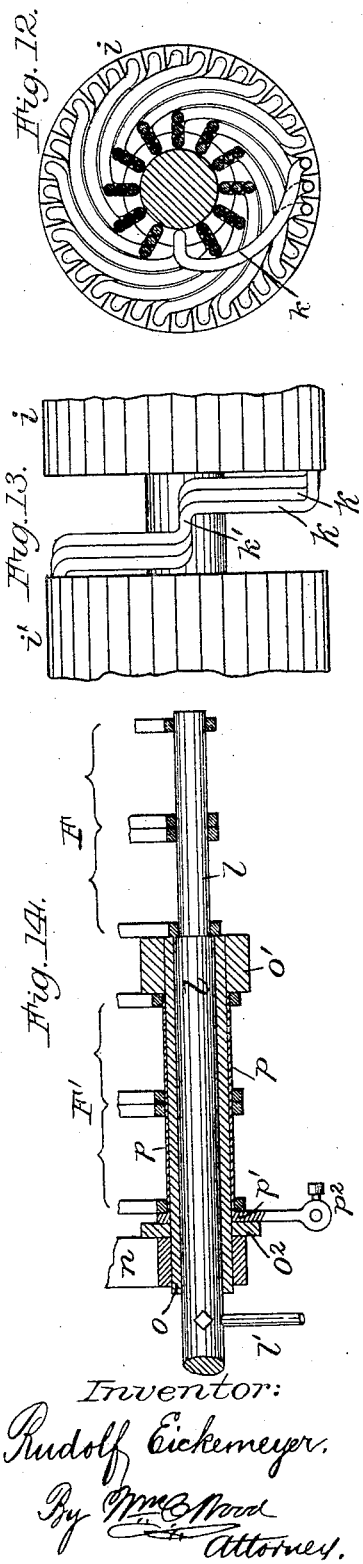
Attest:
Philip F. Larner.
Nowell Bartle
Inventor:
Rudolf Eickemeyer.
By Wm C Ward
Attorney.

UNITED STATES PATENT OFFICE.

RUDOLF EICKEMEYER, OF YONKERS, NEW YORK.

DYNAMO-ELECTRIC MACHINE.

SPECIFICATION forming part of Letters Patent No. 454,336, dated June 16, 1891.

Application filed June 15, 1888. Serial No. 277,161. (No model.)

*To all whom it may concern:*

Be it known that I, RUDOLF EICKEMEYER, of Yonkers, in the county of Westchester and State of New York, have invented certain new and useful Improvements in Dynamo-Electric Machines; and I do hereby declare that the following specification, taken in connection with the drawings furnished and forming a part of the same, is a clear, true, and complete description of the several features of my invention.

My said improvements relate mainly to and are described in connection with machines in which drum-armatures are employed, whether said machines are intended for use as electric motors or generators of electricity; but portions of my invention are more general in their application.

One object of my present invention is to produce a machine of any given capacity in which surplusage is reduced to a minimum with respect of the weight of magnetic metal and of electric conductors, and also in the matter of resistance in the exciting helices or field-coils as well as the armature coils or conductors, and also to supplement said ends by compactness and substantial economy in the cost of construction and repairs. For the accomplishment of these ends I have for the first time combined a drum-armature having a core of magnetic metal and a winding so applied that the ends of the armature are flat and substantially rectangular to its axis, with one or more exciting-helices, which are substantially rectangular and surround the armature longitudinally and diametrically in desirably close relations with the opposite sides and the two ends of the armature, and a casing or shell of magnetic metal, which incloses or surrounds said helices and armature. The longitudinal surfaces of the exciting-helices adjacent to the armature are in planes as near as may be tangential to the armature, the width of said surfaces and planes corresponding substantially to the diameter of the armature, and the spaces between said helices and planes and the curved surface of the armature are substantially filled by projections from the magnetic shell or casing, forming cheeks on opposite sides of the armature.

By employing an armature which in longitudinal central section is substantially rectangular in combination with exciting-helices, which are also substantially rectangular and may be composed of any desired length of wire in any desired number of convolutions without involving any surplusage of wire, and avoiding undue and wasteful resistance. To render the novelty of this feature of my present invention clearly apparent, I will refer to my Letters Patent, No. 358,340, dated February 22, 1887, wherein I disclosed machines having drum-armatures of the usual form and exciting-helices, which at their ends were also rounded in line with the armature-axis, so as to conform with the ends of the armature, which were rounded or bunched longitudinally as an essential incident of ordinary drum-winding. In my said prior machines this rounding and bunching of the wire at the ends of the armature not only involved in the armature-winding a surplusage of wire and consequent objectionable resistance, but it also involved a still greater surplusage of wire and of resistance in the exciting-helices, whereas in my present machine said surplusage is wholly obviated. By thus reducing wasteful and objectionable length of the armature and also of the exciting-helices I am enabled to correspondingly reduce the length of the said surrounding shell or casing of magnetic metal to exact requirements, so that with accurately-proportioned armature-winding and exciting-helices the magnetic metal may also be accurately proportioned thereto with the least possible surplusage of weight and bulk, and this latter end is greatly augmented, because by the arrangement of the armature, exciting-helices, and surrounding shell the magnetic field is restricted to interior portions of the machine, as was fully set forth in my aforesaid Letters Patent. Any armatures winding which will afford at the ends of the armature desirably close relations with the inner surfaces of the ends of the rectangular exciting-helices can be relied upon for use in this combination; but for obtaining the best results, as will hereinafter be more fully indicated, I prefer to employ such armatures as were devised by me and disclosed in my Letters Patent, No. 377,996, dated February 14, 1888, although fairly good results will accrue from the use of a somewhat less complex system of winding, also devised by me and disclosed in another application for Letters Patent. (See application filed June 13, 1888, Serial No. 276,990.) The quantity of wire required for the exciting-helices is further reduced by the presence of the projecting ends of the concave cheeks, which, as before stated, fill the spaces between the exciting-helices and the cylindrical face of the armature, and this feature of my invention is applicable, whether the armature has square or rounded ends.

In my first-mentioned Letters Patent, No. 358,340, I disclosed exciting-helices constructed in two counterpart sections; but I have now for the first time provided for such a subdivision of these main sections and a separation of the sub-sections within the inclosing magnetic casing or shell as affords between them ample air spaces or ducts, which communicate with suitable openings or ports in said casing and enable the free circulation of air to and from the central spaces for obviating the liability of undue heating of the exciting-helices. While this feature of my invention, broadly considered, does not depend either upon the form of the armature or the shape of said helices, the best results will accrue by the use of the rectangular helices and an armature of the type disclosed in my Letters Patent No. 377,996, because in such armatures the arrangement of the wire at the two ends thereof affords a series of curved arms or vanes, which causes the armature to operate as a revolving fan or blower. In working out the ends thus far stated I have also sought to so organize my machines that they may be economically constructed, and so that they can be readily taken apart and the parts conveniently reassembled, and also so that the armature can be removed and remounted without that endwise movement which in heavy machines often results in injury to the winding by abrasive contact with adjacent surfaces. In other words, I have for the first time devised a magnetic shell or casing having sides which are readily detachable, and which on being removed enable the prompt and easy displacement of the whole or the adjacent portion of the exciting-helices and afford full access to the armature, which, if need be, can then be bodily removed laterally after detaching vertical box-covers, which embrace bushing-bearings on the armature-shaft. Either before or after the armature has been thus removed the remaining or rearward exciting-helices can be displaced, and as the helix-sections are counterparts and interchangeable their reassembling is a simple matter. I have also, in a manner well known, provided for the exclusion of oil from the armature and also from the exciting-helices by means of a cup-shaped guard carried by the armature-shaft and inclosing the inner end of one bushing, and at its outer end occupying an annular recess or drip-chamber provided with a discharge-duct and located in the casing and the capped box, within which said bushing is confined.

As a novel feature for protecting the commutator from oil, I have provided the brush-frame hub with an interior annular drip-chamber having a suitable duct or outlet, and on the adjacent end of the commutator-hub there is an annular oil-guard having a lip which occupies an annular slot and extends laterally into the annular drip-chamber.

While the features thus far described are quite independent of any particular forms of commutator or of the brushes employed therewith, I have sought in my present machines the attainment of the very best results, and hence I have devised a complex commutator which involves the use of two commutator-hubs, each having the same number of bars that would be required if a single hub were used. One of these hubs has all of its bars coupled to the armature-winding as if two oppositely-located brushes were to be used therewith, but all of these bars are coupled by means of peculiarly-bent conductors with the bars of the other hub, so as to locate the terminal bars in both hubs in one line, and therefore the two brushes or sets of brushes are placed side by side on one line, and this enables their operation to be observed at a glance. I am aware that several commutator-hubs have been heretofore employed on one armature-shaft, and also that it is not new to employ a single hub carrying two sets of insulated bars or plates coupled by means of conductors within a hollow portion of the shaft and also within the hub; but I believe it to be new to employ two separate hubs with bars coupled by exterior and accessible conductors located between said hubs and extending in each case from a bar in one hub to a diametrically-opposite bar in the other hub. This construction enables me to use a solid armature-shaft and to obviate the intricacies incident to the application and use of conductors within the hub.

The invention consists in details of construction.

To more particularly describe my invention, I will refer to the accompanying three sheets of drawings, in which—

Figure 1, Sheet 1, in a longitudinal central vertical view, illustrates a part of the novel casing or shell, a portion of the exciting-helices, and an armature in side view, said parts being constructed and combined in accordance with my present invention. Figs. 2 and 3 respectively illustrate in end view and partial side view an armature having a winding different from that shown in Fig. 1, but like that affording flat ends, and consequently the desired rectangular longitudinal sectional outline suited for use with rectangular exciting-helices. Fig. 4 is an enlarged view of a portion of the armature-shaft, the bushing, and the oil-guard, which is near the pulley end of the shaft. Fig. 5 is an enlarged view of said shaft, a bushing-bearing, and the oil-guard at the commutator. Fig. 6, Sheet 2, is a top view of the magnetic casing or shell. Fig. 7 is a lateral vertical section of said casing on line $x$, disclosing the exciting-helices in end view. Fig. 8 is a lateral vertical section of said casing and the exciting-helices on line $y$, Fig. 6. Fig. 9 is an end view of a portion of the central part of the casing, including one of the boxes and a bushing-bearing for the armature-shaft near its driving-pulley. Fig. 10 illustrates a portion of the main frame and the armature-shaft in cross-section with a brush frame or carrier as organized for a single-hub commutator and it also illustrates the drip-chamber of Fig. 5. Fig. 11, Sheet 3, is a side view of the machine complete with a complex commutator. Fig. 12 is an end view of one of the commutator-hubs and the conductors, by means of which its bars are coupled to the bars of the other commutator-hub. Fig. 13 in side view illustrates portions of the two commutator-hubs with three of the bar-coupling conductors. Fig. 14 illustrates in detail parts of the frame employed for mounting the brushes for duty with the complex commutator.

The magnetic shell or casing A is composed of a main central section $a$, provided with a broad base at each end, affording suitable feet, through holes in which bolts may be applied for securely mounting the machine in position for service. At one end of this main section there is a vertically-divided box $a'$, having a cap $a^2$ and bolts for securing said cap in place. At the opposite end said main section is provided with an integral frame-like projection $a^3$, on the end of which there is a vertically-divided box $a^4$ in line with the box $a'$ and having a suitable cap and bolts. As shown in Fig. 9, the box $a'$ is divided vertically, but the cap $a^2$ snugly occupies a lateral recess in the casing, so that said cap is supported in its place independently of its bolts, and the box $a^4$ is similarly constructed, thus affording absolutely reliable supports for an armature-shaft, and the main section $a$ and frame-like projections $a^3$ thus form an integral metallic frame entirely surrounding the exciting-helices and armature longitudinally. At each side of the said main section $a$ there are detachable side pieces, which may be varied in number, according to the size and character of the machine. In this instance the two sides are in ten pieces, and four of these (designated, respectively, $b\ b'\ b^2\ b^3$) are of the same size and form, and they may be counterparts and interchangeable, and they may constitute four corner-pieces for the shell or casing, and six of said side pieces (designated) respectively, $b^4, b^5, b^6, b^7, b^8,$ and $b^9$, are counterparts, and three of these with two corner-pieces constitute an entire side of the casing. Whether the pieces at each side of the central section be in one or more parts or pieces they are essentially provided on their inner sides with concaved projections or cheeks $c$ $c'$, which conform to the shape of and practically inclose the armature peripherally and fill substantially all of the spaces between the curved face of the armature and the tangential inner surfaces of the two side portions of the exciting-helices and afford the rectangular spaces between the said cheeks and the casing which are occupied by the helices.

Air-ports $d$ are plentifully provided in the casing—as, for instance, in the top, bottom, and ends of the main section $a$ and also in the side section—and when these latter are in several parts, as shown, several of said air-ports $d$ are provided for by recessing or cutting away opposite portions of the edges of each two adjacent parts, as clearly indicated. These air ports or ducts enable free circulation of cooling drafts of air to and from the interior of the casing.

The exciting-helices B are provided with usual binding-posts and may be constructed in two or more sections, as in my Letters Patent No. 358,340; but to be within one portion of my present invention said sections must be so far separated from each other as to afford intervening air spaces or ducts, and to be within another portion of my present invention they must be rectangular in form and in combination with an armature which is rectangular in its longitudinal sectional outline. As here shown, the exciting-helices B are divided into ten sections $e$, five at each side of the casing, and with intervening spaces $e'$, through all of which spaces or ducts air may freely pass, because of their communication with the air ports or ducts $d$ and the interior of the machine.

As shown in Fig. 1, the interior lines of the exciting-helices are substantially rectangular, and the outer lines are as nearly so as is practicable, the corners being rounded only so far as necessarily follows the use of many convolutions of wire in each helix or section thereof. These sections of helix are counterparts and interchangeable, and at their ends they are bent or curved sufficiently to afford space for an armature-shaft, and they are kept separated by bands of twine or pieces of any suitable non-conducting material.

To be within certain portions of my present invention it is essential, as before stated, that the armature should be of the dynamo or cylindrical type and should have flat ends, affording surfaces rectangular to the armature-shaft, and hence any armature having a winding which is not rounded or bunched at its ends can be used advantageously with said rectangular exciting-helices; but to also involve certain other portions of my invention, the armature at its ends must be so constructed as to enable it to operate efficiently as a fan or blower. The armature C has a magnetic core and a winding of the type devised by me and disclosed in my Letters Patent No. 377,996, the coils thereon being so formed and applied that at the ends of the armature the wire is grouped into a series of curved flat webs $f$, each of which performs efficient service, after the manner of an arm or blade in a revolving fan or blower, for forcibly inducing air-blasts for keeping down the temperature of the interior of the machine, and especially obviating the liability of unduly heating the exciting-helices. The variety of armature-winding illustrated in Figs. 2 and 3 is of a novel character devised by me and disclosed in my aforesaid application for Letter Patent, (see application filed June 13, 1888, Serial No. 276,990,) and while this armature-winding $C'$ affords proper end faces for use with the rectangular exciting helices or coils, said winding would be much less effective than that shown in Figs. 1 and 7 for forcibly inducing the cooling-currents of air desired.

The armature-shaft D is provided with bushings $g$ and $g'$, one at or near each end, and in which said shaft is accurately journaled, and said bushings may be seamless tubes, or they may be longitudinally slitted, and in either case they are respectively clamped in the boxes $a'$ $a^4$ against rotation with the shaft. The shaft D, near the bushing $g$, is provided with a bell-shaped oil-guard $h$, which protects the exciting-helices from oil, in that it annularly surrounds the inner end of said bushing and has at is outer end a lip or flange projected into an annular drip-chamber $h'$, located in the casing $a$ and in the edge of the cover of the adjacent box, so that all oil exuding from the end of the bushing will be carried backward and discharged into said drip-chamber and be delivered therefrom by way of a waste-duct $h^2$ wholly outside of the machine. The bushing-bearing is lubricated by way of a duct leading from an oil-cup $h^3$ on top of the box. At the opposite end of the shaft D the bushing $g'$ has thereon a brush frame or arm annularly recessed on its side to afford a drip-chamber $h^4$, and the commutator-hub has at its end an oil-guard having an annular lip or flange $h^5$, which projects into said drip-chamber, so that all oil escaping from the inner end of the bushing is thrown backward into said chamber and discharged therefrom by the waste-duct $h^6$, thus completely protecting the commutator from oil.

It will be obvious that many of the heretofore-known brush-commutators may be employed in machines embodying those features of my invention thus far described; but the desirability of a complex commutator affording both terminals in one plane and in bars on one line will be readily recognized, and although such a commutator necessarily involves slightly greater length in a machine than a single-hub commutator, as well as a little more weight and cost, it is to be remembered that these additions are more than compensated for in the reduced length and weight in the body of the machine, which results from certain features of my invention, and also by their resultant economy in construction and maintenance.

On Sheet 3 a novel complex commutator E is illustrated, which has been specially devised by me for use in such of my present machines as are constructed with reference to special circumstances—as, for instance, when located in restricted spaces against a wall or when mounted upon an elevated bracket or shelf, as is often desirable on shipboard, or in such other localities as would render it inconvenient to observe the operation of brushes located on opposite sides of a hub, as in ordinary commutators. My complex commutator consists of two separate, complete, and counterpart hubs $i$ and $i'$, each having the same number of bars as if but one hub were to be relied upon, and they are mounted side by side on the armature-shaft D, but separated by ample space at their coincident ends. The bars of the hub $i$ are coupled to the armature-coils as when but one hub is employed; but each of said bars is electrically coupled to a diametrically-opposite bar of the hub $i'$ by means of a peculiarly bent or curved conductor $k$, and these conductors are grouped more or less, according to the number of commutator-bars. As here shown, the conductors $k$ are in groups of three wires each, as clearly indicated in Figs. 12 and 13. Each conductor is bent so as to afford a straight central portion $k'$, parallel with the axis of the armature-shaft and to locate the two ends in different planes, and said two ends are bent in involute lines, so that the three wires of each group, being formed into a flat web, as clearly indicated, may occupy a minimum of the circular space and enable said groups or webs to be symmetrically and evenly distributed and arranged, as clearly indicated. With the conductors $k$ thus arranged the commutator-terminals of the machine are respectively in the two hubs and at the front side of both and in bars which are in line with each other, as is clearly indicated. In Fig. 12 the end of commutator-hub $i$ is shown with all of the conductors $k$, except three, (illustrated as if cut off centrally,) and these three are complete and grouped and are again shown in Fig. 13 coupled to the hub $i'$. This combination of counterpart hubs with the exterior conductors obviates the necessity of having a hollow armature-shaft, as well as arranging the armature-terminals within said shaft, and also the threading of conductors through holes in a hub, as when one hub has two sets of bars thereon.

The two sets of brushes F and F' each embody two groups of brush-plates and they are mounted upon a frame or holder of novel construction. This brush frame or holder includes a rod $l$, which also serves as an electric conductor, an arm $m$, which is axially mounted at one end upon the end of the armature-shaft D, but at its other end it embraces or supports said rod $l$, and a second arm $n$, longer than arm $m$ and in the form of a lever, fulcrumed upon, but insulated from, the armature-shaft and carrying at one end said rod $l$, and at its opposite end it is controlled by a screw $n'$, swiveled in a bracket or arm projecting from the frame $a^3$ of the machine, and said screw is also tapped into a rotative nut $n^2$ in the frame-arm, as clearly shown in Figs. 10 and 11, so that said frame and the brushes may be rotatively adjusted with reference to the commutator-hubs. The screw $n'$ not only serves as an adjusting-screw, but also for confining the brushes securely in their adjusted position against accidental displacement. The brushes F are electrically connected to and carried by the rod $l$, which at its outer end is laterally bored and provided with a clamp-screw for serving as a binding-post for the reception of a conductor $l'$. The brushes F' are also supported by said rod $l$, but are insulated therefrom by a non-conducting bushing or sleeve $o$; but the several arms of the brush-holders are mounted upon and electrically connected by means of a metallic sleeve $p$, which surrounds the bushing $o$, and at one end of said sleeve a metallic collar $p'$ is electrically connected with said sleeve and brush-holder, so that a screw-post $p^2$, projecting therefrom, serves as the second terminal of the machine. On said insulating-bushing $o$ and between the two sets of brushes a large insulating-washer $o'$ is interposed, and another insulating-washer $o^2$ is interposed between the collar $p'$ and the arm $n$, the latter, as well as the arm $m$, being well insulated from the electric conducting-rod $l$. The arm $n$, when adapted to carry brushes for a single-hub commutator, is arranged as shown in Fig. 10, and it is provided with the screw $n'$ and rotative nut $n^2$, already described; but the second arm $m$ will not be needed. The arm $n$ in this case has at each end a conducting-rod $l^2$, on which the brushes are respectively mounted for contact with opposite sides of the hub. The brush-plate clamps are provided with helical springs $q$ for forcing them into proper contact with the conducting-surfaces of the commutator-hubs.

The brush-holder arm $n$, as before indicated, and as shown in Figs. 5 and 10, has an annular recess $h^4$ for the reception of such waste oil as must inevitably leave the adjacent bearing and follow the surface of the armature-shaft. The oil on reaching the outer end of the commutator $i'$ will be carried centrifugally against the under side of the annular oil-guard $h^3$, projecting from the end of the commutator-hub, and be deposited within the recess $h^4$ in the brush-arm $n$, thus keeping the contact-face of the commutator and its insulating material absolutely free from oil.

When the brushes are to be arranged for operating the machine as a motor, the conducting-rod $l$ of Figs. 11 and 14 will be duplicated, as well as the brushes, and both the arms $m$ and $n$ will be fulcrumed, as in Fig. 10, and both sets of brushes will be capable of being lifted from the hubs, or either set can be permitted to rest in contact therewith, according to the rotative direction desired in the armature.

It will be readily obvious that by reason of the thus-described novel features in construction, combination, and arrangement I attain the several objective ends hereinbefore indicated.

Having thus described my invention, I claim as new and desire to secure by Letters Patent—

1. In a dynamo-electric machine, the combination, with a cylindrical armature and an exciting helix or helices longitudinally surrounding and directly polarizing said armature, of a surrounding magnetic shell or casing provided with inwardly-projecting concaved cheeks on opposite sides of the armature, which are curved to conform to and practically inclose said armature peripherally and fill substantially all of the spaces between the curved face of the armature and the tangential inner surfaces of the side portions of the exciting-helices, and also afford between said cheeks and the exterior portions of the casing the rectangular recesses in which the side portions of the exciting-helices are located, substantially as described.

2. In a dynamo-electric machine, the combination, with a cylindrical armature and an exciting helix or helices for directly polarizing said armature, of a surrounding magnetic shell or casing consisting of a main central section and cheek-pieces hollowed to correspond to the cylindrical form of said armature and bolted to the sides of said central section, substantially as described.

3. In a dynamo-electric machine, the combination, with a cylindrical armature and an exciting helix or helices for directly polarizing said armature, of appropriate cheek-pieces and an integral metallic frame surrounding said helices and armature longitudinally, substantially as described.

4. In a dynamo-electric machine, the combination, substantially as hereinbefore described, of an armature, exciting-helices surrounding said armature and constructed in two main sections, which are subdivided into other sections separated from each other to afford between them air spaces or ducts, and a magnetic shell or casing inclosing said helices and the armature and provided with air ports or ducts whereby currents of air toward or from the interior of the machine will pass freely between the sections of the exciting-helices and prevent them from becoming unduly heated.

5. In a dynamo-electric machine, the combination, substantially as hereinbefore described, of a magnetic shell or casing provided with air ducts or ports, exciting-helices inclosed by said shell and constructed in sections separated by spaces to afford air-ducts between said sections, and an armature containing magnetic metal within said shell and directly polarized by said helices, and having a winding composed of coils, which at the ends of the armature are arranged in curved webs or groups, which serve as the arms or fans of a blower for effectively inducing cooling currents of air to and from the interior of the machine and between the sections of the exciting-helices.

6. In a dynamo-electric machine, the combination of an armature, exciting-helices, and a magnetic shell or casing which incloses said armature and helices and is composed of a central section having thereon boxes in which the armature-shaft is supported or mounted and side pieces detachably connected to said central section, substantially as described, whereby on removing one side of said casing the exciting-helices may be removed and replaced, the armature fully exposed while still rotatively mounted or readily removed laterally from and replaced in its operative position.

7. In a dynamo-electric machine, the combination of a brush-frame having an annular oil-drip chamber and an outlet-duct, and a commutator-hub provided at its outer end with an annular flange which projects through an annular slot in the frame and into said drip-chamber, substantially as described, whereby oil from the adjacent bearing of the armature-shaft is kept from the commutator and delivered into said drip-chamber.

8. In a dynamo-electric machine, the combination, with the armature, of a complex commutator embodying a hub having bars electrically connected with the armature-winding as when but one hub is employed, and a second hub having the same number of bars as the first, but separated therefrom on the armature-shaft, and between said hubs a series of exterior conductors, which are grouped around the shaft in involute lines and couple each bar of one hub with the diametrically-opposite bar of the other hub, substantially as described, for placing both terminal bars at the same side of the commutator and in line with each other.

9. In a dynamo-electric machine, the combination of a complex commutator consisting of two counterpart hubs mounted side by side on the armature-shaft, electric conductors grouped in involute lines around said shaft between said hubs for connecting the bars in one hub with diametrically-opposite bars in the other hub, and terminal brushes respectively in contact with both hubs at one side thereof and on the same line and mounted in a frame or holder pivoted on the armature-shaft and provided with an adjusting-screw.

RUDOLF EICKEMEYER.

Witnesses:
JAMES S. FITCH,
NORTON P. OTIS.